United States Patent
Livingston et al.

(10) Patent No.: US 7,280,193 B2
(45) Date of Patent: Oct. 9, 2007

(54) DISTINGUISHING MIRROR SPECKLE FROM TARGET IMAGES IN WEAK SIGNAL APPLICATIONS

(75) Inventors: Peter M. Livingston, Palos Verdes Estates, CA (US); Jonathan W. Arenberg, Santa Monica, CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 90 days.

(21) Appl. No.: 11/286,967

(22) Filed: Nov. 22, 2005

(65) Prior Publication Data
US 2007/0114359 A1    May 24, 2007

(51) Int. Cl.
  *G01B 9/00*    (2006.01)
  *G01M 11/00*   (2006.01)
(52) U.S. Cl. .................................. 356/124; 356/124.5
(58) Field of Classification Search ............... None
  See application file for complete search history.

(56) References Cited

U.S. PATENT DOCUMENTS

| | | | | |
|---|---|---|---|---|
| 5,093,563 A | * | 3/1992 | Small et al. | 250/201.9 |
| 5,412,200 A | * | 5/1995 | Rhoads | 250/201.9 |
| 5,448,053 A | * | 9/1995 | Rhoads | 250/201.9 |
| 5,450,352 A | * | 9/1995 | Ftaclas et al. | 356/124.5 |
| 6,084,227 A | * | 7/2000 | Rhoads | 250/201.9 |
| 6,344,640 B1 | * | 2/2002 | Rhoads | 250/201.9 |
| 6,429,415 B1 | * | 8/2002 | Rhoads | 250/208.1 |
| 7,130,051 B2 | * | 10/2006 | Oppenheimer et al. | 356/445 |

* cited by examiner

*Primary Examiner*—Michael P. Stafira
(74) *Attorney, Agent, or Firm*—Carmen B. Patti & Assoc., LLC

(57) ABSTRACT

Apparatus, and a related method, for eliminating the effect of speckle images caused by surface imperfections in a primary mirror of a stellar coronagraph. Depending on their size, mirror imperfections can result in speckles in a field of view that also includes an image of a distant target planet. By generating a traveling surface wave in the mirror surface, and then tuning the spatial wavelength of the surface wave to approximately match that of a surface imperfection, the speckle image corresponding to that surface imperfection is made to twinkle in irradiance. Tuning the traveling surface wave though a wide range of spatial wavelengths causes each speckle image in turn to be identified by twinkling, while the target planetary image remains unvarying. Accordingly, multiple speckles corresponding to different mirror imperfections may be conveniently eliminated by image processing.

12 Claims, 4 Drawing Sheets

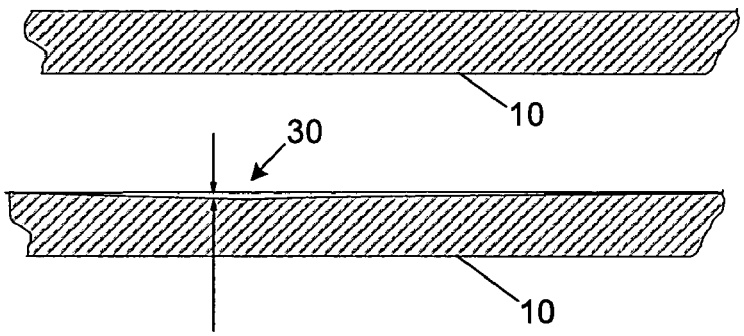
FIG. 4A
FIG. 4B
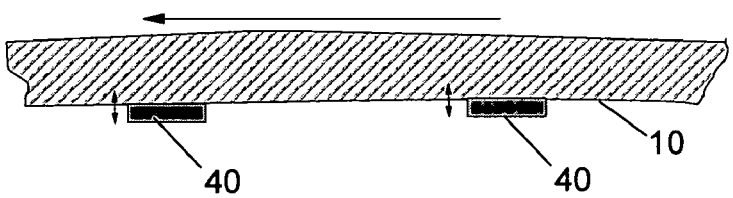
FIG. 5A
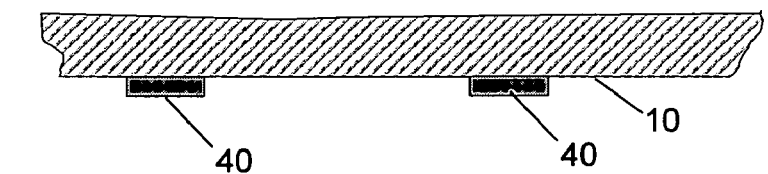
FIG. 5B
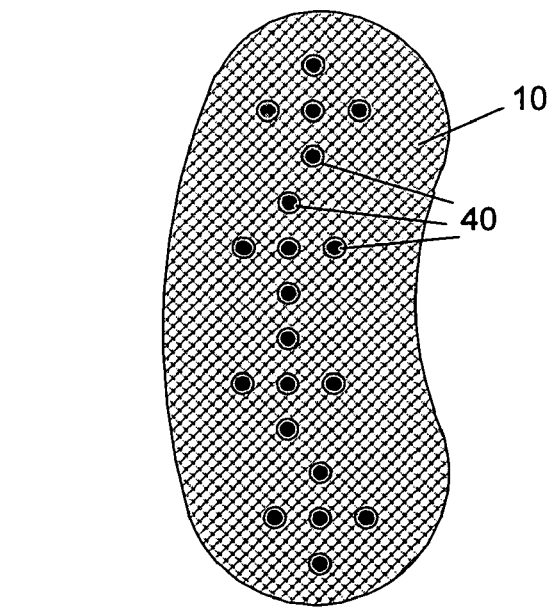
FIG. 6

DISTINGUISHING MIRROR SPECKLE FROM TARGET IMAGES IN WEAK SIGNAL APPLICATIONS

BACKGROUND OF THE INVENTION

This invention relates generally to optical image processing and, more particularly, to techniques for distinguishing images of distant stellar or planetary bodies from false images caused by speckles in optical imaging components, such as telescope mirrors. There is an ongoing interest in developing a reliable technique for locating Earth-like planets orbiting distant star systems. Planets have been detected largely as a result of observing perturbations in regular motions of stars, from which the presence of planets or companion stars may be inferred.

Direct terrestrial observation of planets in distant star systems is hindered by atmospheric distortion of light received in a ground-based telescope. Although use of a space-based telescope overcomes this drawback, another difficulty of direct observation of such a distant planet, even from space, is its relative proximity to the star system, in which it is located. Bright stellar radiation can saturate photodetectors associated with the telescope and make it very difficult to detect reflected light from a planet in the same field of view. One known solution to this difficulty is to employ a stellar coronagraph to occlude the stellar radiation. The solar coronagraph was invented for the purpose of observing corona activity near the sun and observing motions of planets in the solar system while masking out the sun's radiation. The same principle can be employed in a stellar coronagraph, which is designed to occlude direct radiation from a star, while imaging a surrounding field of view in which one or more planets may be directly observed.

Imaging a field of view around a target star and occluding direct radiation from the star should, in theory, produce an imaged spot wherever a planet is located in the field of view, especially if a large space-based reflecting telescope is employed. Unfortunately, however, this technique is reliably accurate only if a near perfect telescope mirror is used. Any permanent or temporary imperfection or disturbance in the mirror surface can result in the formation of a speckle in image. The speckle size will be roughly proportional to the star diameter, and the speckle magnitude (i.e., brightness) will be proportional to the magnitude of the blocked stellar radiation. The speckle location in the field of view is dependent on the size of the disturbance in the mirror surface. The relevant measure in this regard is the spatial wavelength of the disturbance. If the spatial wavelength of the disturbance is comparable to the mirror diameter, the speckle falls within the occluded stellar spot, so is not visible in the field of view. If, on the other hand, the spatial wavelength of the disturbance is, for example, one-third to one-tenth of the mirror diameter, then the speckle appears near the stellar occlusion region, where it is difficult to distinguish from a similarly sized spot due to light reflected from a planet.

One possible theoretical solution to the problem presented by mirror disturbance speckles is to build a mirror with no such disturbances. As a practical matter, this solution is virtually impossible to implement because it would require a mirror built to extremely fine dimensional tolerances. Even if the cost of such a mirror could be justified, the structure would still be subject to environmental changes, such as large extremes of temperature, that would distort the mirror surface in space. Another possible solution is to rotate the mirror about its optical axis while viewing the imaged target area. Speckles derived from mirror imperfections would rotate in the imaged field of view, but any spot derived from reflected planetary radiation would be unaffected by the rotation. Unfortunately, rotation of the mirror while maintaining accuracy in all other respects, such as pointing angle, presents significant engineering concerns, which inevitably would require equipment of additional complexity and cost.

Accordingly, there is still a significant need for a technique for imaging distant planets and, in particular, for distinguishing planetary images from speckles caused by imperfections in optical components of the telescope. The present invention satisfies this need.

SUMMARY OF THE INVENTION

As shown in the drawings for purposes of illustration, the present invention resides in apparatus and a related method for conveniently identifying which spots in a coronagraph image are due to optical component imperfections. Briefly, and in general terms, the present invention may be defined as a method for distinguishing a target image from speckles due to mirror imperfections in a stellar coronagraph, the method comprising the steps of receiving, in a primary mirror, reflected light from a distant target planet and stellar radiation from a star system near the target planet; removing the stellar radiation from consideration using stellar coronagraph principles; forming an image of the target planet, in combination with unwanted speckle images caused by imperfections in the primary mirror; generating a surface wave in the primary mirror at a controllable spatial wavelength; varying the spatial wavelength of the induced surface wave to match, or approximately match, the spatial wavelength of at least one surface deformation in the primary mirror, wherein the speckle image corresponding to the matched surface deformation twinkles as a result of the traveling surface wave; and eliminating the twinkled speckle image from consideration in forming the image of the target planet.

More specifically, there is normally a plurality of surface deformations in the primary mirror; and the step of varying the spatial wavelength of the induced surface wave comprises tuning the spatial wavelength over a range that encompasses the spatial wavelengths of all of the surface deformations. Each speckle image corresponding to a surface deformation is made to twinkle when its spatial wavelength matches, or nearly matches, that of the induced surface wave. Twinkling speckles corresponding to all of the surface deformations allow discrimination between the speckles and the image of the target planet, which does not twinkle as a result of the traveling surface wave.

The step of forming an image preferably comprises forming a succession of images at selected times while the spatial wavelength of the induced surface wave is varied; and logically combining the succession of images to eliminate twinkling speckle images and to leave only the image of the distant planet.

The step of generating a surface wave in the primary mirror preferably comprises applying timed impulses to a plurality of transducers attached to the primary mirror. The step of varying the spatial wavelength comprises varying the timing of the impulses applied to the individual transducers.

The method of the invention may further comprise the step of recording radiation from the target planet only during periods when the speckle image corresponding to at least one matched surface deformation is extinguished as a result of twinkling. During these periods, radiation from the target planet can be recorded with the benefit of an improved signal-to-noise ratio because unwanted radiation from at least one speckle image is eliminated.

As expressed in terms of apparatus, the invention may be defined as comprising a primary mirror, for receiving reflected light from a distant target planet and stellar radiation from a star system near the target planet; a stellar coronagraph, for removing the stellar radiation from consideration; a detector array, for forming an image of the target planet, in combination with unwanted speckle images caused by imperfections in the primary mirror; means for generating an induced surface wave in the primary mirror at a controllable spatial wavelength; means for varying the spatial wavelength of the traveling surface wave to approximately match the spatial wavelength of at least one surface deformation in the primary mirror; and means for eliminating the matched speckle image from consideration in forming the image of the target planet. The speckle image corresponding to the matched surface deformation twinkles as a result of the induced surface wave but the image of the target planet remains unvarying and can be readily distinguished from the unwanted speckle images.

It will be appreciated from the foregoing summary that the present invention represents a significant advance in detection of distant planets. In particular, the invention facilitates the elimination of speckle images caused by mirror imperfections. Therefore, these optical imperfections can be tolerated because their effects can be conveniently eliminated. Other aspects and advantages of the invention will become apparent from the following more detailed description, taken in conjunction with the accompanying drawings.

BRIEF DESCRIPTION OF THE DRAWINGS

FIG. 4A is a fragmentary cross-sectional view of the mirror of the coronagraph, showing an ideal reflecting surface with no irregularities.

FIG. 4B is a view similar to FIG. 4A but depicting an area of the mirror surface that departs from its ideal contour.

FIG. 5A is a fragmentary cross-sectional view of the mirror, showing the effect of a traveling wave deliberately generated on the mirror surface.

FIG. 5B is a view similar to FIG. 5A, showing no traveling wave but with the mirror surface reverting to its condition in which there is a surface imperfection.

FIG. 6 is a fragmentary back view of the mirror, showing the positions of attached piezoelectric transducer elements.

DETAILED DESCRIPTION OF THE INVENTION

Figure 1:
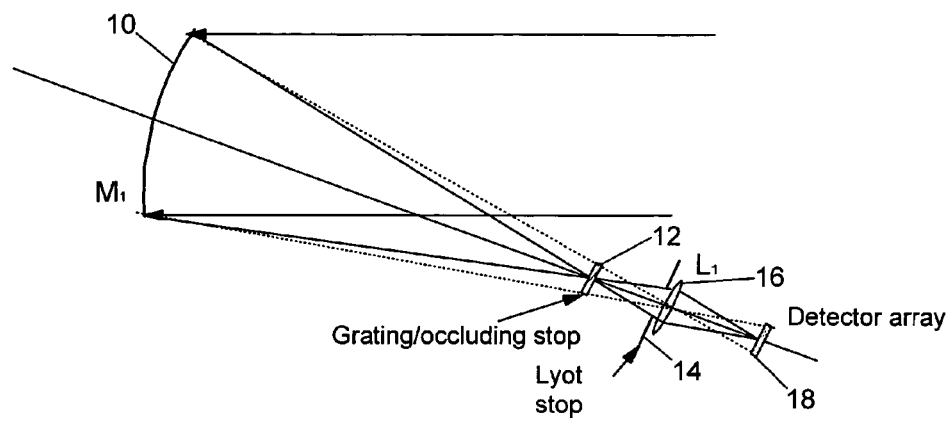
FIG. 1 is a diagram depicting the principle of the stellar coronagraph.

As shown in the drawings for purposes of illustration, the present invention pertains to techniques for locating distant planets using a stellar coronagraph. Although a spaced-based stellar coronagraph of suitable size is capable if imaging planetary objects close to distant star, the coronagraph is known to produce confusingly similar speckles imaged with the planetary spot or spots. The speckles are caused by physical disturbances in major optical components, such a primary mirror. Distinguishing a planetary image spot from unwanted but similar speckles in the image has, until the present invention, proved to be an elusive and expensive proposition.

In accordance with the present invention, image speckles due to mirror disturbances are identifiable by applying a deliberate spatially periodic disturbance to the mirror, which causes the irradiance of each speckle to vary periodically, while the planetary image is not subject to this irradiance variation.

FIG. 1 is an optical ray diagram showing the principle of a conventional stellar coronagraph. Light from a distant star system encounters a primary mirror 10 and is brought to a focus on a coronagraph occluding element 12 at a first focal plane. The occluding element may be implemented as an occluding spot that is positioned to mask direct radiation from a star in a view field of interest. Alternatively, the occluding element 12 may be an intensity grating that performs a functionally identical task. Light from the star system that is not occluded passes through a Lyot stop 14 and into a lens 16, which re-images the light onto a second focal plane, where an optical detector array 18 is positioned. The Lyot stop 14 is an aperture that operates in conjunction with the occluding element 12 to limit the effect of direct and diffracted light from the star, on the detector array 18.

Figure 2:
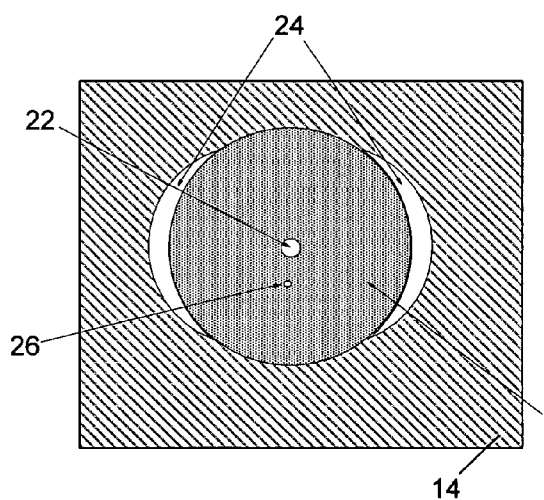
FIG. 2 is a diagrammatic view of an image formed, theoretically, by a stellar coronagraph, the image including a spot derived from radiation reflected from a planet.

FIG. 2 represents a view taken along the optical axis at the Lyot stop 14. Transmitted light is enclosed within a circular field of view 20, at the center of which is a small circular exclusion zone 22 resulting from presence of the occluding element 12. Radiation from the central star also produces two symmetric crescents 24 on either side of the Lyot stop aperture. The detected planet appears as a weak unresolved spot 26 within the field of view 20.

Figure 3:
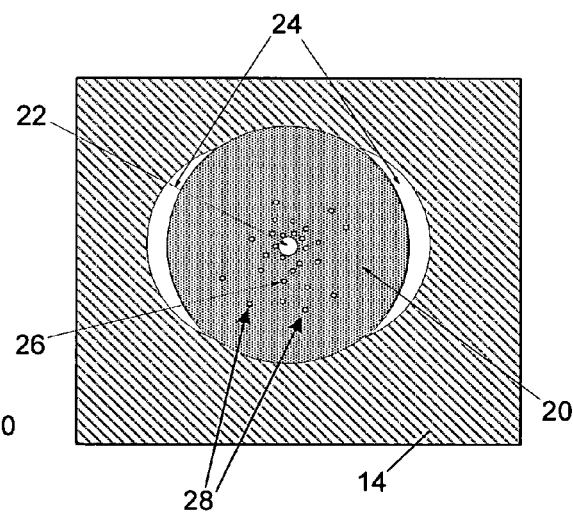
FIG. 3 is a view similar to FIG. 2, but in which the image also includes a number of speckles caused by disturbances in the mirror surface of the coronagraph.

FIG. 2 shows only the theoretical operation of a stellar coronagraph in detecting a planet. FIG. 3, on the other hand, shows the effect of multiple disturbances in the surface of the primary mirror 10, resulting in multiple speckles 28 in the field of view 20. Speckle size is roughly determined by the star diameter, and speckle magnitude (i.e., brightness or irradiance) is proportional to the blocked stellar magnitude. Speckle location within the field of view 20 is determined by the size of the disturbance in the mirror surface relative to the mirror diameter. If the disturbance size, or spatial wavelength, is near the mirror diameter, the speckle spot falls within the occluded spot and is not seen. On the other hand, if the disturbance in the mirror figure is shortened to a fraction of the mirror diameter, such as $\frac{1}{3}^{rd}$ or $\frac{1}{10}^{th}$ of a mirror diameter, the speckle appears nearer the central occlusion region and in the field of view, as shown. If the speckle disturbance source has relatively small lateral dimensions, such as millimeters (mm) to microns (μm), the speckle pattern falls outside the field of view 20 and on the Lyot stop 14.

FIG. 4A shows an ideal cross section of a portion of the primary mirror 10. For convenience, the ideal surface is shown as flat, although it will be understood that the ideal surface of the primary mirror has a desired convexly curved contour. As shown in FIG. 4B, the mirror 10 may have imperfections, such as the minor departure 30 from the surface identity shown in FIG. 4A. The departure 30, measured perpendicular to the mirror 10 is typically only a fraction of the optical wavelength. What is more important from the standpoint of generation of speckles is the size of the departure 30 measured parallel to the mirror surface. As noted above, if this imperfection size, also referred to as its spatial wavelength, is on a scale comparable to a large fraction of the mirror diameter, then the resulting speckles, which are imperfect stellar images, appear in the field of view 20. Imperfections close in scale to the mirror diameter result in spurious images within the occluded region of the mirror, whereas imperfections of a millimeter or micron scale result in spurious images outside the field of view 20.

In accordance with an important aspect of the invention, the mirror 10 is subjected to deliberate periodic disturbances imparted by transducers 40 positioned on the back side of the mirror. The transducers 40 may be, for example, piezo-electric transducers. When appropriately located and actuated, the transducers 40 are made to produce a spatial wave within the mirror 10, as shown diagrammatically in FIG. 5A. Moreover, in accordance with another important aspect of the invention the wavelength of this induced wave may be controlled to match the spatial wavelength of a given imperfection in the mirror 10. Although the spatial wavelength of imperfections in the mirror will in general not be known, each of the unknown spatial wavelengths can be matched in turn by "tuning" the wavelength of the deliberately induced traveling wave to the spatial wavelengths of the imperfections.

More specifically, the mirror 10 has a network of piezo-electric transducer elements 40 attached to the back of the mirror, as shown in FIG. 6. These set up traveling bending waves in the mirror 10. Both the phase and frequency of the mirror excitation is controllable through deliverance of time-phased impulses to the mirror by meals of the piezo-electric elements 40. When the spatial frequency of the mirror disturbance matches that of the surface deformation, the corresponding speckle will "twinkle," i.e., will vary periodically in irradiance. The spot image corresponding to a detected planet will not, of course, be subject to the same effect.

Scanning through a broad spatial wavelength frequency and phase spectrum will cause all of the speckles to twinkle during some part of the scan. This will permit, if desired, cataloguing all of the transducer driving modes that cause each particular speckle to twinkle, and thereby measuring miniscule, long wavelength errors in the mirror surface in situ.

Figure 7:
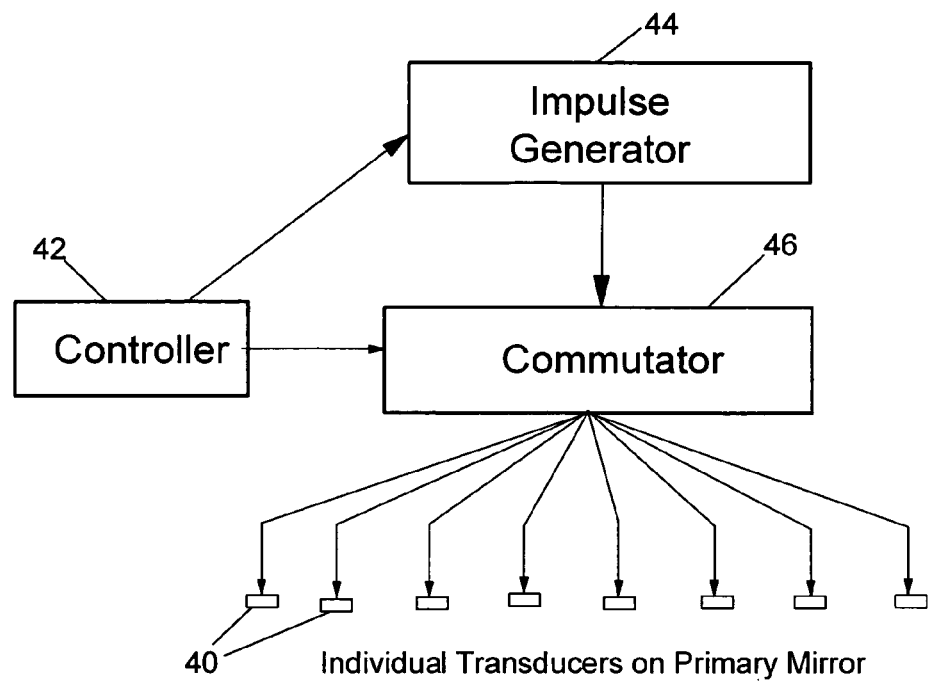
FIG. 7 is a block diagram showing the principal components of apparatus in accordance with the present invention.

FIG. 7 is a block diagram of a system for controlling flexure modes of a primary mirror 10 in accordance with the invention. In essence, the system comprises a controller 40 coupled to an impulse generator 42 and a commutator 44. The primary mirror 10 has a number of flexure modes that can be determined by analysis. Under direction of the controller 40, the impulse generator 42 generates a pulse that is distributed to each of the individual transducers 30, but subject to prescribed time delays in the commutator 44. Any of the mirror flexure modes can be excited by appropriate timing and distribution of the pulses to the individual transducers 30.

Figure 8:
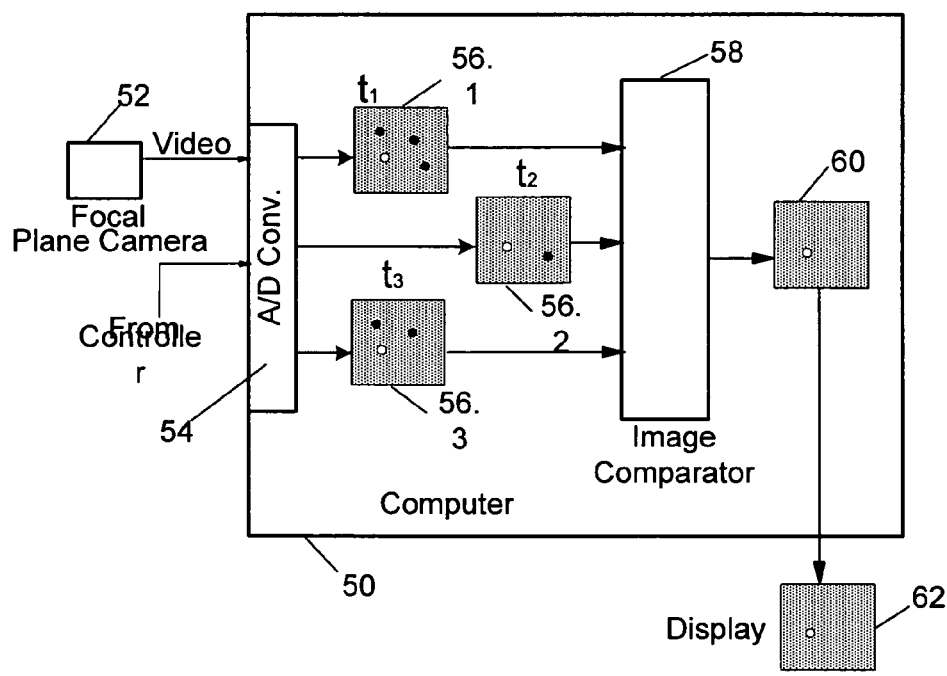
FIG. 8 is a block diagram depicting operation of a computer for comparing successive images produced by the apparatus, and eliminating unwanted speckles from the images.

FIG. 8 shows in principle how a signal processing computer 50 is used eliminate speckle images from coronagraph output data. The focal plane detector 18 is coupled to a focal plane camera 52, which generates a video signal representing a continuous sequence of images at the focal plane, for processing by the computer 50. The computer 50 includes an analog-to-digital converter 54 (ADC), which, under direction from the controller 40, converts a streaming video signal from the focal plane camera 42 into pixelized images in computer memory. For example, the ADC 54 may produce a sequence of images corresponding to times $t_1$, $t_2$ and $t_3$, as indicated at 56.1, 56.2 and 56.3, respectively. The computer 50 also includes an image comparator module 58, which compares the images created at times $t_1$, $t_2$ and $t_3$. This example is not intended to imply that the apparatus is limited to processing only three successive images. In a practical implementation, the computer 50 processes a succession of images captured over a relatively long period of observation of a single field of view, while the mirror 10 is subject to excitation over a range of spatial wavelengths. Then the mirror 10 may be directed to another, typically adjacent, field of view to continue searching the sky.

In effect, the image comparator 58 performs a logical AND operation on the successive images from the focal plane camera 52. As discussed above, when the primary mirror 10 is appropriately excited a traveling wave in the mirror surface will have the effect of periodically extinguishing at least one speckle in the mirror image. In other words, at an appropriate excitation frequency, at least one speckle will be made to twinkle and will be extinguished at certain times. By way of example, the image at time $t_1$, is depicted as containing a planetary spot and three speckle images. The image at time $t_2$ depicts the same field of view but in which the first and second of the three speckles have been extinguished at that instant in time. The image at time $t_3$ depicts the same field of view but in which only the third speckle is extinguished at that instant in time. When the three images are logically ANDed together, all three speckles are eliminated and only the planetary image remains, as shown in the computer memory image depicted at 60, which is output to a display 62. More specifically, the image comparator 58 performs a pixel-by-pixel comparison of the multiple image frames 56. Over a period of time, as the excitation of the mirror 10 is tuned over a range of frequencies, the pixels corresponding to each of the speckle images will be extinguished momentarily as a result of the twinkling of each speckle. Twinkling pixels are successively eliminated in the image comparator 58 until only the pixels corresponding to the true planet image remain.

Figure 9A:
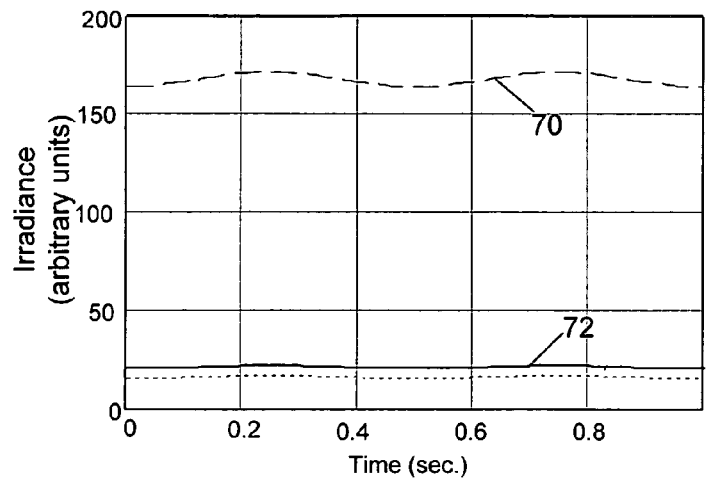
FIGS. 9A, 9B and 9C are graphs showing the effect, on speckle irradiance, of varying a driven spatial wavelength with respect to the spatial wavelength of a mirror disturbance from which the speckle is derived.
Figure 9B:
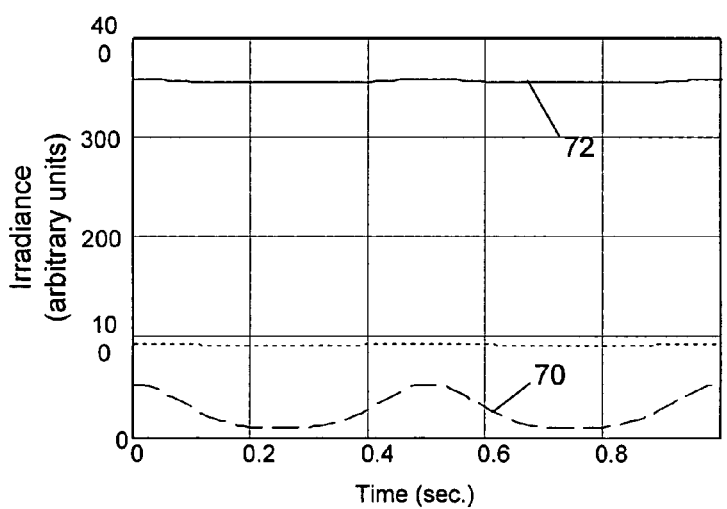
Figure 9C:
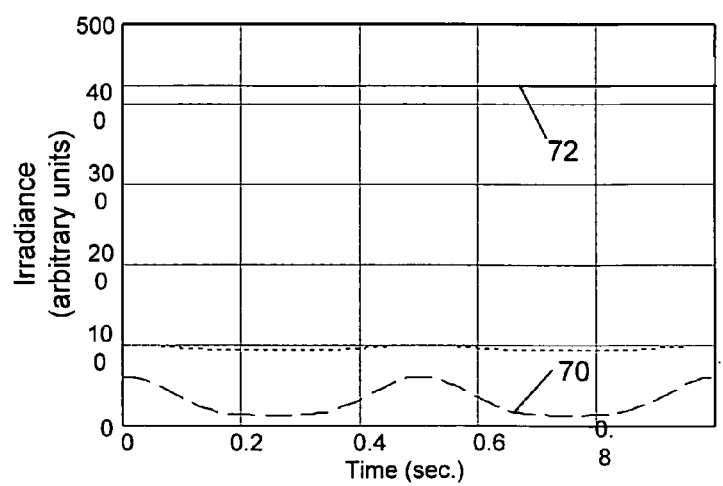

FIGS. 9A, 9B and 9C illustrate by way of example how the speckle twinkling phenomenon depends on the spatial wavelength of the traveling wave excited in the primary mirror 10. In particular, each of the three figures plots the variation of irradiance of a speckle with time, in comparison with a relatively steady signal from a planetary source. In FIG. 9A, the speckle spatial wavelength is 9 meters and the wavelength of the forced deformation is 4.5 meters. Variation of the speckle irradiance is discernable, but not pronounced, in the dashed line 70, in relation to the solid line 72, which indicates the relatively steady irradiance from the target planet. In all three examples, the mirror is assumed to have a diameter of 10 meters and an effective focal length of 100 meters. In FIG. 9B, the spatial wavelength of the forced mirror deformation has been increased to 7.2 meters, resulting in a more pronounced periodic variation in speckle irradiance. In FIG. 9C, the spatial wavelength of the forced mirror deformation has been further increased to 9 meters, i.e., effectively "tuned" to the spatial wavelength of the mirror imperfection from which the speckle was derived.

The variation in speckle irradiance is most pronounced when the forced mirror deformation is tuned to the speckle spatial wavelength.

Accordingly, the invention provides a convenient discrimination mechanism for distinguishing between target images and unwanted speckle images caused by mirror imperfections. When the driven disturbance of the mirror 10 has the same spatial wavelength as the speckle-causing mirror non-uniformity, the speckle twinkles because the imposed disturbance momentarily cancels the phase aberration causing the speckle. Although the invention has been discussed in terms of elimination of speckles from the resulting image, the phenomenon has another related use in analyzing radiation from a target planet. An improved signal-to-noise ratio of photoelectrons from the planet will be obtained at instants in time when the twinkling speckles are suppressed. In cases where there is a relatively small number of speckles to be eliminated, the signal-to-noise advantage can be achieved during periods of suppression of the twinkling speckles and not during periods when the twinkles are at full strength.

It will be appreciated from the foregoing that the present invention represents a significant advance in the technology of detection of planetary bodies with coronagraph apparatus. In particular, the invention provides a technique for distinguishing a planetary image from speckles resulting from imperfections in the primary mirror of the coronagraph. It will also be appreciated that, although a specific embodiment of the invention has been illustrated and described in detail, various modifications may be made without departing from the spirit and scope of the invention. Accordingly, the invention should not be limited except as by the appended claims.

The invention claimed is:

1. A method for distinguishing a target image from speckles due to mirror imperfections in a stellar coronagraph, the method comprising:
   receiving, in a primary mirror, reflected light from a distant target planet and stellar radiation from a star system near the target planet;
   removing the stellar radiation from consideration using stellar coronagraph principles;
   forming an image of the target planet, in combination with unwanted speckle images caused by imperfections in the primary mirror;
   generating a surface wave in the primary mirror at a controllable spatial wavelength;
   varying the spatial wavelength of the induced surface wave to match or approximately match the spatial wavelength of at least one surface deformation in the primary mirror, wherein the speckle image corresponding to the at least one matched surface deformation twinkles as a result of the traveling surface wave; and
   eliminating the at least one matched speckle image from consideration in forming the image of the target planet.

2. A method as defined in claim 1, wherein:
   the at least one surface deformation includes a plurality of surface deformations;
   the step of varying the spatial wavelength of the induced surface wave comprises tuning the spatial wavelength over a range that encompasses the spatial wavelengths of all of the surface deformations; and
   each speckle image corresponding to a surface deformation is made to twinkle when its spatial wavelength approximately matches that of the induced surface wave;
   whereby twinkling speckles corresponding to all of the surface deformations allow discrimination between the speckles and the image of the target planet, which does not twinkle as a result of the induced surface wave.

3. A method as defined in claim 2, wherein the step of forming an image comprises:
   forming a succession of images at selected times while the spatial wavelength of the induced surface wave is varied; and
   logically combining the succession of images to eliminate twinkling speckle images and to leave only the image of the distant planet.

4. A method as defined in claim 1, wherein the step of generating a traveling surface wave in the primary mirror comprises:
   applying timed impulses to a plurality of transducers attached to the primary mirror.

5. A method as defined in claim 4, wherein the step of varying the spatial wavelength comprises:
   varying the timing of the impulses applied to the individual transducers.

6. A method as defined in claim 1, and further comprising:
   recording radiation from the target planet only during periods when the speckle image corresponding to the at least one matched surface deformation is extinguished as a result of twinkling, whereby radiation from the target planet has an improved signal-to-noise ratio because radiation from the speckle image is eliminated.

7. Apparatus for distinguishing a target image from speckles due to mirror imperfections in a stellar coronagraph, the apparatus comprising:
   a primary mirror, for receiving reflected light from a distant target planet and stellar radiation from a star system near the target planet;
   a stellar coronagraph, for removing the stellar radiation from consideration;
   a detector array, for forming an image of the target planet, in combination with unwanted speckle images caused by imperfections in the primary mirror;
   means for generating a traveling surface wave in the primary mirror at a controllable spatial wavelength;
   means for varying the spatial wavelength of the induced surface wave to approximately match the spatial wavelength of at least one surface deformation in the primary mirror, wherein the speckle image corresponding to the at least one matched surface deformation twinkles as a result of the traveling surface wave; and
   means for eliminating the at least one matched speckle image from consideration in forming the image of the target planet.

8. Apparatus as defined in claim 7, wherein:
   the at least one surface deformation includes a plurality of surface deformations;
   the means for varying the spatial wavelength of the traveling surface wave comprises means for tuning the spatial wavelength over a range that encompasses the spatial wavelengths of all of the surface deformations; and
   each speckle image corresponding to a surface deformation is made to twinkle when its spatial wavelength approximately matches that of the traveling surface wave;
   whereby twinkling speckles corresponding all of the surface deformations allow discrimination between the speckles and the image of the target planet, which does not twinkle as a result of the traveling surface wave.

9. Apparatus as defined in claim 8, and further comprising:
   means for forming a succession of images at selected times while the spatial wavelength of the traveling surface wave is varied; and
   means for logically combining the succession of images to eliminate twinkling speckle images and to leave only the image of the distant planet.

10. Apparatus as defined in claim 8, wherein the means for generating a traveling surface wave in the primary mirror comprises:
   a plurality of transducers attached to the primary mirror; and
   means for applying timed impulses to the transducers attached to the primary mirror.

11. A method as defined in claim 10, wherein the means for varying the spatial wavelength comprises:
   means for varying the timing of the impulses applied to the individual transducers.

12. Apparatus as defined in claim 1, and further comprising:
   means for recording radiation from the target planet only during periods when the speckle image corresponding to the at least one matched surface deformation is extinguished as a result of twinkling, whereby radiation from the target planet has an improved signal-to-noise ratio because radiation from the speckle image is eliminated.

* * * * *